Nov. 25, 1969 R. V. JONES, JR., ET AL 3,480,283
PHONOGRAPH SYSTEM
Filed Feb. 13, 1967
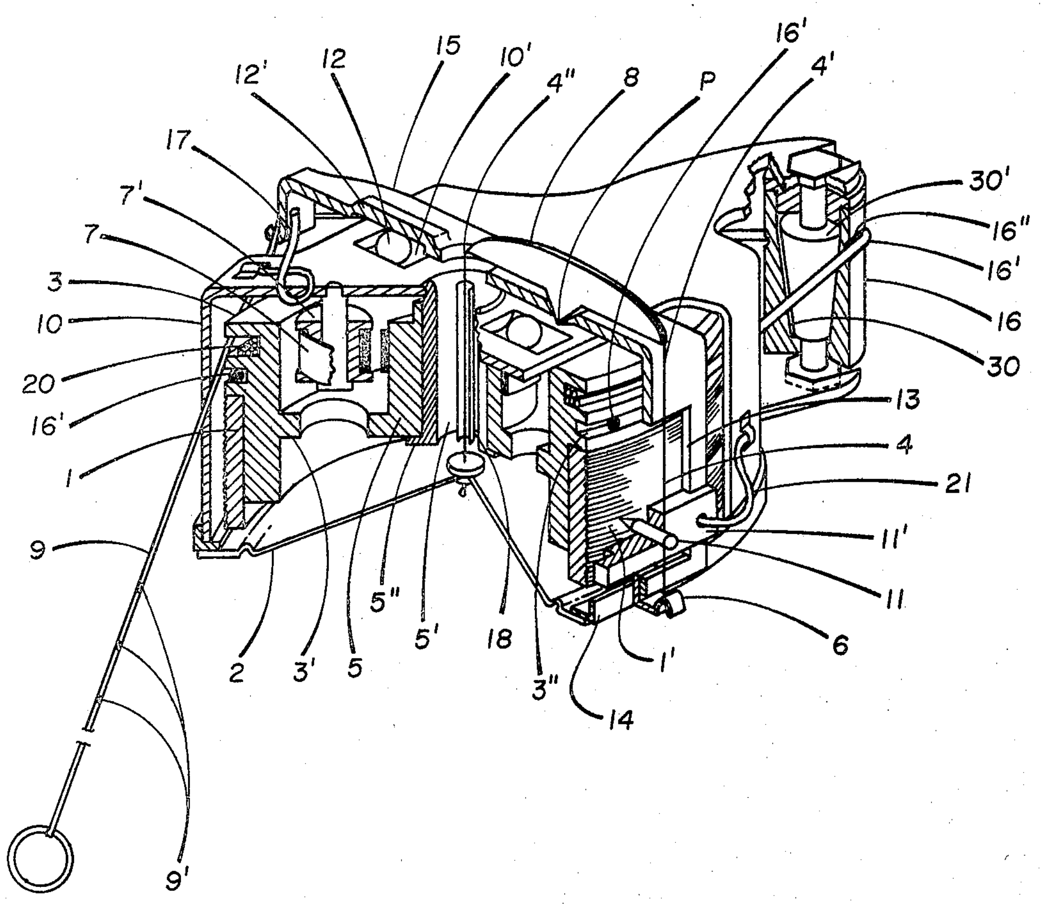
ROYAL V. JONES, JR.
CLAYTON H. ALLEN
COLIN G. GORDON INVENTORS
BY Rines and Rines
ATTORNEYS United States Patent Office 3,480,283
Patented Nov. 25, 1969

3,480,283

PHONOGRAPH SYSTEM

Royal V. Jones, Jr., Waltham, Clayton H. Allen, Wellesley and Colin G. Gordon, Bedford, Mass., assignors to Bolt, Beranek and Newman Inc., Cambridge, Mass., a corporation of Massachusetts Filed Feb. 13, 1967, Ser. No. 615,537
Int. Cl. G11b *3/26;* G10k *9/10*
U.S. Cl. 274—17 8 Claims

ABSTRACT OF THE DISCLOSURE

This invention embodies a phonograph system provided with a novel tensioned wire coupling system between the needle engaging a drum-type record and the loudspeaker reproducing apparatus, and preferably including viscous conical-surface speed control means.

The present invention relates to phonograph systems, being more particularly directed to self-powered sound-reproducing systems of compact and inexpensive construction for such applications as sound-producing toys and the like; it being understood, however, that certain of the novel features of the invention are more broadly applicable to other types of sound-reproducing systems as well.

Dolls and other toys and similar devices have previously been equipped with small phonograph mechanisms of the self-powered type wherein a needle is mechanically coupled to a sound-reproducing loudspeaker device such that by the pulling of a drawstring or the like, a spring device is energized to power the movement of a phonograph record against the needle. Prior art devices of this type have often required the use of circular record discs which, in combination with the requisite needle mounting structures, have introduced serious limitations in the number and length of messages that may be recorded on a small size record and have introduced problems in terms of the quality of reproduction resulting from varying groove speeds and the like. Such devices have also required in some cases the use of viscous coupling mechanisms between the needle and the loudspeaker for permitting movement of the needle relative to the record while yet allowing sound energy to be transmitted between the two. Such constructions, however, introduce complexities and limitations into the acoustic transmission path between the needle and the sound-reproducing loudspeaker. In addition, prior art recording devices have also been subject to the disadvantage that the position where the needle plays upon the disc record after each successive operation of the spring-tensioning device is a matter of random chance. In such system, therefore, the user has had no control over message selection and is unable to select different messages at will.

An object of the present invention, accordingly, is to provide a new and improved phonograph apparatus of the abovementioned type which shall not be subject to any of the previously described disadvantages, but that, to the contrary removes the inherent restrictions accompanying the use of disc records and, if desired, the uncertainties of selection of desired recorded messages thereon.

A further object is to provide a novel sound-reproducing apparatus of more general utility as well.

Other and further objects will be hereinafter delineated, being more particularly set forth in the appended claims.

In summary, the invention contemplates the use of a preferably cylindrical drum record provided on its exterior surface with a plurality of circumferential or helically spiralled recorded grooves, preferably recorded in the lateral mode and representing multiple messages. A sound-reproducing loudspeaker means is provided at the bottom end of the drum. A needle holder is mounted outside the drum in a manner that allows it to slide parallel to the drum axis. It is normally pressed toward the drum to hold the needle within the record grooves. The vibrations transmitted to the needle holder from the recorded grooves are conveyed via Coulomb friction to a tensioned wire and thence to the loudspeaker. The tensioned wire is held between the loudspeaker and a tensioning spring. It rests against the needle holder but allows the needle holder to slide relative to it for positioning the needle in the groove and for allowing the needle to track freely. The wire, futhermore, is of configuration that folds back upon itself in that it runs up the outside of the cylinder, then along a radius and down the axis of the cylinder. This change in direction is achieved with insignificant loss of vibration transmission by a unique rocker arm device. A carriage is provided movable laterally with respect to the drum upon the operation of a tensioning drawstring or the like which not only serves to tension the drive means for the drum, but also in moving the carriage serves to move the needle out of engagement with and away from the drum record grooves during the operation of the tensioning of the spring drive means. Preferred constructional details and novel subcombination features, particularly suited to the combination of the complete apparatus but useful also apart from the complete system, are hereinafter more fully explained.

The invention will now be described with reference to the accompanying drawing, the single figure of which is a perspective view, partly sectionalized to illustrate details of construction, and showing the invenion in a preferred form.

A substantially cylindrical drum record 1 is carried at the lower end of a cylindrical drum carrier 3 rotatable by a driving reel 5 about an axially disposed hollow shaft 5' bottomed at 5'' under a transverse central plate 3'. The driving reel 5 is powered by a spring 7 shown in the preferred form of the well-known "Negator" type spring. The mechanical system, and particularly the hollow shaft 5', supporting the drum carrier 3, and the spindle carrying the spring reel 7', is supported upon an outer support frame 10 extending external to the lateral walls of the drum support 3 and over the top thereof. The spring 7 is tensioned through the pulling of a drawstring or the like 9 wound within a groove 20 at the upper end of the drum carrier 3. As the drawstring 9 is pulled, the spring 7 becomes wound upon the drive reel 5. Upon release of the string 9, the spring thus wound upon the drive reel 5 causes the drum carrier 3 to rotate in one direction, say, to the right, so that the record grooves 1' circumferentially helically spiralled in the external surface of the record drum 1 are moved in one direction past a phonograph needle 11 carried in a needle holder 11'. The pulling of the string 9 will, of course, move the drum-carried record grooves 1' in the opposite direction (to the left) for rewinding purposes.

The needle holder 11' is shown mounted within a slot 13 in a carriage support bracket 15, extending from the right-hand side of the apparatus (as illustrated in the drawing) over the top thereof, above the frame 10, such that the needle is constrained to move up and down in a direction parallel to the axis of the drum 1. The carriage support 15 is mounted on the support frame 10 in a manner later explained, such that it may be moved laterally with respect to the drum structure 1, 3 and its axis upon the pulling of the string 9, so that the needle 11 is permitted to disengage the record grooves 1' and drop downward away from the drum record grooves under the influence of a reset spring 21. As before stated, this action will occur at the same time that the spring 7 is being tensioned upon the drive reel 5. A return spring 17 carried between the carriage bracket support 15 and the support frame 10 of the apparatus returns the carriage so that the needle 11 is engaged within the record grooves 1′ at some circumferential position along the drum dependent upon the extent to which the drawstring 9 has been pulled.

The recorded messages upon the drum record 1 are preferably carried in a number of successive individual grooves, all of which start at one region of the drum, each, however, at a different circumferential position, and which spiral along the drum to the opposite region thereof. The user, by pulling the drawstring 9 different predetermined extents, as shown by the calibrations 9′, may therefore pre-select the desired record groove and thus the desired message that is to be played. The calibrations 9′ may be color-coded or otherwise indicative of the different messages.

In order to obviate the before-described problems in connection with coupling the mechanical vibrations produced in the needle, through its engagement with the record grooves 1′, to a sound-reproducing loudspeaker 2′ disposed at the bottom end of the drum, and without the necessity for the viscous coupling mechanisms and other devices of the prior art before referred to, a novel sound-coupling system is provided. This involves a small diameter wire 4 that is mounted under tension between a spring 6 at the bottom of the slot 13 in the carriage support 15 and the loudspeaker 2′. The tensioned wire 4 rests against the needle holder 11′ with some positive pressure. Vibrational energy that is transmitted to the needle holder 11′ from the laterally recorded grooves 1′, via the needle 11, is passed to the tensioned wire 4 as a longitudinal vibration by Coulomb friction which limits small amplitude movement between the needle holder 11′ and the tensioned wire. This construction, on the other hand, permits the large relative movements that are required for tracking and resetting purposes. The tension wire 4 thus frictionally presses against the stylus or needle holding mechanism 11′ with the needle engaging the grooves 1′. It is this frictional force which carries the vibrational signal from the record grooves 1′ to the wire 4 and then by means of the wire 4 to the loudspeaker 2′ with negligible loss of signal. It will be noted that this type of coupling avoids the losses that inherently appear in prior-art viscous and other sliding coupling mechanisms. This construction, moreover, compensates for warping and eccentricities and the like in the record, and minimizes the necessity for manufacturing tolerances of any high order, thus enabling the device to be built at very low cost for such purposes as toys and the like, if desired.

This method of coupling also avoids many of the disadvantages of such piror art devices and, particularly, allows the needle to be remotely positioned from the loudspeaker. The resonances of conventional mechanical coupling structures in the audible frequency range are avoided since the thin wire 4 has a very small mass; and, when held under a high degree of tension, introduces mechanical resonances in its longitudinal, driving direction which are at high frequencies lying outside the required reproducing range. The tensioned wire 4 is susceptible to lateral resonance vibrations which lie in the audible frequency range, but these are poorly coupled to motion in the longitudinal driving direction and are easily damped out by a close fitting sleeve of damping material 18, disposed about the portion of the wire 4 within the hollow shaft 5′, between the later-described rocker arm 8 and the speaker 2′. The resonance of the system is thus controlled exclusively by the sound-reproducing loudspeaker 2′ and the spring 6.

A further unique feature resides in the means by which the tensioned wire 4 is carried around a corner so that it may pass from the needle carrier 11′, on the outside of the drum, to the loudspeaker 2′, on the inside of the drum. This is achieved with insignificant loss of vibrational energy by the before-mentioned rocker arm 8, pivoted on the upper surface of the carriage support 15 and carrying the substantially radially inwardly extending portion of the tensioned wire 4 so that it may bridge between the point 4′ outside the periphery of the drum where the wire extends upward from the needle holder 11′ adjacent the side of the drum and the point 4″ on the axis of the drum where the wire passes axially downward towards the loudspeaker 2′.

Through this construction, and the particular positioning of the parts as above described, a very compact and inexpensive system is produced avoiding many of the disadvantages previously mentioned as inherent in prior art devices. As an example, a dozen three-second recordings can readily be provided on a recording drum surface 1, about ½″ long and about 1¾″ in diameter, rotated at a speed of about one revolution per second. Unlike disc records, it is observed that the groove speed is a constant, thus introducing a relatively high degree of similar reproducing quality for all messages and from beginning to end of each message.

The carriage support 15 is preferably supported from the support frame 10 upon small ball-bearings 12 disposed in recesses 10′ in the upper surface of the frame 10 and in corresponding ball rollways 12′ in the undersurface of the carriage 15. The ball rollways 12′ in the carriage also serve to stiffen the structure. The right-hand ball roller 12 is preferably located as shown, close to the pivot point P of the rocker arm 8 in order to give maximum support to the rocker arm. The support frame 10 also serves to support the loudspeaker 2′ at its lower end by means of a clamping ring 14.

The grooves 1′ are laterally recorded such that the needle 11 is caused to vibrate vertically up and downward in the direction of the tension wire 4. The tension wire is by this means highly insensitive to "hill and dale" motions such as might be caused by scratching, dirt, etc. It should be noted that when the needle 11 is removed from contact with the grooves 1′ by operation of the pull drawstring 9, it disengages from the tensioning wire 4, as well.

The speed of the drum structure 1, 3 during its playing period is controlled by a viscous speed controller 16 which is connected or coupled by an O-ring 16′ passing within a groove 16″ in the speed controller housing and circumferentially around the entire drum 3 within groove 3″. While the speed controller has utility apart from the particular combination shown, it is particularly designed for and suited to the purposes of the invention. Within the housing 16, a conical recess 30 is provided, receiving a similarly shaped coaxial cone member 30′ axially supported through sealed bearings at the top and bottom of the housing and rotatable within the recess 30 with a viscous liquid, such as liquid silicones, in the space therebetween. Since the movement between the coaxial-conical surfaces 30 and 30′ increases with speed, as the housing 16 rotates with the drum 3 at an increased speed, the torque between the conical surfaces will increase, balancing the torque of the spring 5 and thus acting to control the speed of the drum structure. A further feature of this construction resides in its inherent self-centering properties.

Further modifications will occur to those skilled in this art and all such are considered to fall within the spirit and scope of the invention as defined in the appended claims.

What is claimed is:

1. A phonograph system having, in combination, a substantially cylindrical drum record exteriorly provided with a plurality of circumferential recording grooves, sound-reproducing means, record drive means for driving the drum in one direction for record playing and in the opposite direction for record rewinding, spring means connected with the drive means for powering the same to rotate the drum in the said one direction upon tensioning of the spring means, means for tensioning the spring means while causing the drive means to rewind the record in the said opposite direction, needle-holding means mounted slidably in a direction parallel to the axis of the drum adjacent a predetermined exterior region thereof, tensioned wire means frictionally pressing the needle-holding means toward the drum to hold the needle thereof within the record grooves and extending into mechanical engagement with the sound-reproducing means to couple vibrations of the needle to the sound-reproducing means, and means controlled with the means for tensioning the spring means for moving the needle-holding means away from the drum during the tensioning of the said spring means, the said sound-reproducing means being mounted at one end of the drum and the said tensioned wire means extending along the side of the drum adjacent the needle-holding means and thence substantially radially inwardly of the drum at its other end and substantially axially through the drum to the sound-reproducing means.

2. A system as claimed in claim 1 and in which damping means is provided upon the tensioned wire means along the portion of its extension axially through the drum.

3. A system as claimed in claim 1 and in which carriage means is provided at the said other end of the drum, movable laterally with respect to the drum upon operation of the said means controlled with means for tensioning the spring means and carrying rocker arms means for supporting the tensioned wire means along a portion of its extension radially inward.

4. A system as claimed in claim 1 and in which successive grooves contain separate recorded messages the commencements of which are positioned at different points along the record drum, in order that different extents of operation of the means for tensioning the spring means enables disposition of the needle in different pre-selected grooves.

5. A system as claimed in claim 1 and in which the means for tensioning the spring means comprises draw-string means calibrated to indicate said different extents of operation corresponding to the separate recorded messages.

6. A phonograph system having, in combination, a substantially cylindrical drum record exteriorly provided with a plurality of circumferential recording grooves, sound-reproducing means, record drive means for driving the drum in one direction for record playing and in the opposite direction for record rewinding, spring means connected with the drive means for powering the same to rotate the drum in the said one direction upon tensioning of the spring means, means for tensioning the spring means while causing the drive means to rewind the record in the said opposite direction, needle-holding means mounted slidably in a direction parallel to the axis of the drum adjacent a predetermined exterior region thereof, tensioned wire means frictionally pressing the needle-holding means toward the drum to hold the needle thereof within the record grooves and extending into mechanical engagement with the sound-reproducing means to couple vibrations of the needle to the sound-reproducing means, means controlled with the means for tensioning the spring means for moving the needle-holding means away from the drum during the tensioning of the said spring means, and speed control means coupled to rotate with the drum, the said speed control means comprising viscous-coupled adjacent relatively rotatable coaxial conical surfaces the torque between which increases upon increase in speed of the drum and vice versa, thus to balance and control drum speed changes, the outer conical surface being coupled to rotate with the drum.

7. A system as claimed in claim 6 and in which the outer conical surface comprises a housing having a conical recess containing an inner cone separated from the recess walls by a viscous liquid.

8. A phonograph system having, in combination, a substantially cylindrical drum record exteriorly provided with a plurality of circumferential recording grooves, sound-reproducing means, record drive means for driving the drum in one direction for record playing and in the opposite direction for record rewinding, spring means connected with the drive means for powering the same to rotate the drum in the said one direction upon tensioning of the spring means, means for tensioning the spring means while causing the drive means to rewind the record in the said opposite direction, needle-holding means mounted slidably in a direction parallel to the axis of the drum adjacent a predetermined exterior region thereof, tensioned wire means extending from a support adjacent one end thereof into mechanical engagement with the sound-reproducing means adjacent the opposite end thereof, said tensioned wire means having a side surface thereof intermediate its said ends engaging said needle-holding means and frictionally pressing the needle-holding means toward the drum to hold the needle thereof within the record grooves and coupling vibrations of the needle to the sound-reproducing means, and means controlled with the means for tensioning the spring means for moving the needle-holding means away from the drum during the tensioning of the said spring means.

References Cited

UNITED STATES PATENTS

| | | | |
|---|---|---|---|
| 3,370,855 | 2/1968 | Lindsay | 274—1 |
| 1,244,588 | 10/1917 | Cole | 274—1.1 |

HARRY N. HAROIAN, Primary Examiner

U.S. Cl. X.R.

274—1